(12) United States Patent
Inoue

(10) Patent No.: US 6,994,472 B2
(45) Date of Patent: Feb. 7, 2006

(54) ROLLING BEARING APPARATUS

(75) Inventor: Masahir Inoue, Nara (JP)

(73) Assignee: Koyo Seiko Co., Ltd., Osaka (JP)

( * ) Notice: Subject to any disclaimer, the term of this patent is extended or adjusted under 35 U.S.C. 154(b) by 84 days.

(21) Appl. No.: 10/743,066

(22) Filed: Dec. 23, 2003

(65) Prior Publication Data

US 2004/0136628 A1 Jul. 15, 2004

(30) Foreign Application Priority Data

| Dec. 24, 2002 | (JP) | ............................. 2002-372499 |
| Dec. 24, 2002 | (JP) | ............................. 2002-372500 |
| Dec. 24, 2002 | (JP) | ............................. 2002-372501 |

(51) Int. Cl.
  *F16C 32/00* (2006.01)

(52) U.S. Cl. ................................................... 384/448

(58) Field of Classification Search ............... 384/448, 384/446; 324/174, 173, 207.25
  See application file for complete search history.

(56) References Cited

U.S. PATENT DOCUMENTS

| 4,946,296 | A | * | 8/1990 | Olschewski et al. ......... 384/448 |
| 4,968,156 | A | * | 11/1990 | Hajzler ....................... 384/448 |
| 5,004,358 | A | * | 4/1991 | Varvello et al. ............. 384/446 |
| 5,011,303 | A | * | 4/1991 | Caron ......................... 384/448 |
| 5,038,471 | A | * | 8/1991 | Peilloud et al. .............. 384/448 |
| 5,195,830 | A | * | 3/1993 | Caillault et al. ............. 384/448 |
| 5,470,157 | A | * | 11/1995 | Dougherty et al. .......... 384/448 |
| 5,938,346 | A | * | 8/1999 | Ouchi ......................... 384/448 |
| 5,969,518 | A | * | 10/1999 | Merklein et al. ............ 324/173 |
| 6,094,046 | A | * | 7/2000 | Message et al. ............. 324/173 |
| 6,559,633 | B1 | * | 5/2003 | Nachtigal et al. ............ 324/174 |
| 6,773,164 | B2 | * | 8/2004 | Meeker et al. ............... 384/448 |

FOREIGN PATENT DOCUMENTS

| JP | 3-6457 | 1/1991 |
| JP | 10-48230 | 2/1998 |
| JP | 2000-211311 | 8/2000 |

* cited by examiner

*Primary Examiner*—Thomas R. Hannon
(74) *Attorney, Agent, or Firm*—McGinn IP Law Group, PLLC

(57) ABSTRACT

In order to detect rotational speed and rotational direction of an axle, achieve compact formation of the rotation detector, and be excellent in dust resistance performance, a rolling bearing apparatus includes balls interposed between respective raceway surfaces of inner and outer ring members and a seal apparatus is mounted between shoulder portions of the inner and outer ring members. The seal apparatus includes an outer ring side seal ring fixed to the outer ring member and an inner ring side seal ring fixed to the inner ring member. Moreover, a pulser ring is fixed to an inner face of a ring-like core metal of the inner ring side seal ring and on an outer diameter side of a ring-like core metal of the outer ring side seal ring. A regular and reverse rotation detecting sensor is molded by a resin-made external member to integrate.

23 Claims, 15 Drawing Sheets

ROLLING BEARING APPARATUS

BACKGROUND OF THE INVENTION

1. Field of the Invention

The present invention relates to a rolling bearing apparatus constituted by integrating a sensor and a pulser ring for detecting rotation used in ABS (anti-lock brake system) or the like of an automobile to a seal apparatus referred to as a so-to-speak pack seal and sealing a clearance between inner and outer rings by the seal apparatus integrated with the rotation detector.

The present invention also relates to a rolling bearing apparatus having a rotation detector used in ABS (anti-lock brake system) or the like of an automobile.

2. Description of the Related Art

In a related art, there is a bearing apparatus for rotatably supporting an axle of an automobile relative to a vehicle body which is provided with a rotation detector used in ABS or the like (refer to, for example, Patent Reference 1).

According to the bearing apparatus, a rolling member is interposed between respective raceway surfaces of an inner ring fitted outwardly to the axle and constituting a rotating ring and an outer ring fixed to the vehicle body and constituting a fixed ring and a clearance between the inner and the outer rings is sealed by a seal apparatus.

A rotation detector is constructed by a constitution of detecting a change in a magnetic field of a pulser ring fixed to the inner ring constituting the rotating ring by a sensor and transmitting the detection signal to an electronic circuit of the vehicle body via a harness.

Although there is a sufficient space for installing the sensor on a side of a driven wheel, on a side of a driving wheel, a constant-velocity joint is disposed contiguous to the bearing apparatus and therefore, the sensor is provided by utilizing a small space between the bearing apparatus and the constant-velocity joint.

In another related art, there is a bearing apparatus for rotatably supporting an axle of an automobile relative to a vehicle body which is provided with a rotation detector used in ABS or the like (refer to, for example, Patent Reference 2).

The bearing apparatus is constituted by interposing a rolling member between respective raceway surfaces of an outer ring outwardly fitted to an axle and constituting a rotating ring and an outer ring fixed to a vehicle body and constituting a fixed ring.

A rotation detector is constructed by a constitution of detecting a change in a magnetic field of a pulser ring fixed to the inner ring constituting the rotating ring by a sensor and transmitting the detection signal to an electronic circuit of the vehicle body via a harness.

In another related art, there is a bearing apparatus for rotatably supporting an axle of an automobile relative to a vehicle body which is provided with a rotation detector used in ABS or the like (refer to, for example, Patent Reference 3).

According to the bearing apparatus, a rolling member is interposed between respective raceway surfaces of an outer ring fitted to a wheel side and constituting a rotating ring and an inner ring fixed to a vehicle body side and constituting a fixed ring and a clearance between the inner and the outer rings is sealed by a seal is apparatus.

A rotation detector is constructed by a constitution of detecting a change in a magnetic field of a pulser ring fixed to the outer ring constituting the rotating ring by a sensor and transmitting the detection signal to an electronic circuit of the vehicle body via a harness.

[Patent Reference 1]: JP-A-10-48230
[Patent Reference 2]: JP-A-3-6457
[Patent Reference 3]: JP-A-2000-211311

As a sensor for ABS in recent times, a regular and reverse rotation detecting sensor is used for detection of backward movement on a sloping road, an automatic longitudinal row parking function and the like. However, the regular and reverse rotation detecting sensor is large-sized and therefore, when the sensor is installed at the small space on the side of the driving wheel, the sensor is provided to fix to a knuckle.

Further, the pulser ring is provided to expose to an outer face of the bearing apparatus to be opposed to the regular and reverse rotation detecting sensor fixed to the knuckle.

In this way, the pulser ring and the regular and reverse rotation detecting sensor are provided to expose to outside of the bearing apparatus and there poses a problem of being deficient in hermetically sealing performance and inferior in dust resistance performance.

Further, the regular and reverse rotation detecting sensor is provided separately from the bearing apparatus, further, the pulser ring is provided at the outer face of the bearing apparatus, the exclusive space is large and compact formation has been desired to be able to install the sensor in a smaller space.

Normally, the sensor is fixed to a knuckle and the electronic circuit is provided at the vehicle body. Therefore, since the knuckle is connected to a damper against swinging of the vehicle body in running, vibration of the vehicle body is not transmitted to the knuckle. Therefore, whereas the electronic circuit provided at the vehicle body is vibrated by swinging of the vehicle body, the sensor fixed to the knuckle is not influenced by vibration of the vehicle body. Therefore, there is a concern of disconnecting the harness connecting the sensor and the electronic circuit by vibration of the vehicle body.

Further, a sensor for ABS in recent times is included in a seal apparatus which is mounted to a bearing apparatus and is referred to as a so-to-speak pack seal for space saving formation.

Therefore, when the harness of the sensor is disconnected and the ABS sensor becomes abnormal, there poses a problem that it is necessary to interchange a total of a hub unit including the bearing apparatus, time and labor is taken in maintenance operation and also the cost becomes expensive.

Moreover, a detecting face of the rotation detector and a detected face of the pulser ring are arranged to be opposed to each other, an air gap is needed therebetween, a space for installing the rotation detector is enlarged, as a result, a problem that the bearing apparatus becomes large-sized is posed.

Further, a seal lip of a seal apparatus and the rotation detector are provided to be aligned in an axial direction and a problem that the bearing apparatus becomes large-sized is posed.

Since the bearing apparatus becomes large-sized in this way, compact formation thereof has been desired.

SUMMARY OF THE INVENTION

In order to solve the above-mentioned problems, the present invention provides following rolling bearing apparatuses.

According to the invention, in a rolling bearing apparatus comprising an inner ring member constituting a rotating ring having a raceway surface, an outer ring member arranged concentric with the inner ring member and constituting a fixed ring having a raceway surface in correspondence with the inner ring member, a rolling member interposed between the respective raceway surfaces of the inner ring member and the outer ring member, a seal apparatus for sealing a clearance between the inner ring member and the outer ring member and a rotation detector for detecting a state of rotating the inner ring member wherein the seal apparatus comprises an outer ring side seal ring fixed to the outer ring and an inner ring side seal ring fixed to the inner ring member, and the rotation detector comprises a magnetic sensor molded by a resin-made external member to integrate therewith on an outer diameter side of a ring-like core metal of the outer ring side seal ring and a magnetic ring fixed to an inner face of a ring-like core metal of the inner ring side seal ring and a rotational speed and a rotational direction of the inner ring member are detected by detecting the magnetic ring by the magnetic sensor.

A harness of the magnetic sensor is divided into a first harness connected to the magnetic sensor and a second harness connected to an electric circuit of a vehicle body, wherein the first harness and the second harness are connected to each other via a connector provided at a knuckle for fixing the outer ring member.

As a rotation detector, there is used, for example, an active type detector for changing an output thereof in accordance with a change in a magnetic flux, a pulser ring is pointed out for the magnetic ring and a regular and reverse rotation detecting sensor constituted by two pieces of magnetic sensors arranged to separate in a peripheral direction is pointed out for the magnetic sensor.

According to the rolling bearing apparatus of the invention, the rotational speed and the rotational direction of the axle can be detected by the rotation detector.

The magnetic ring is fixed to the inner face of the ring-like core metal of the inner ring side seal ring, further, the magnetic sensor is molded by the resin-made external member to integrate therewith on the outer diameter side of the ring-like core metal of the outer ring side, the seal ring and the magnetic sensor are promoted in hermetically sealing performance and excellent in dust resistance performance.

The magnetic ring is provided at the inner face of the ring-like core metal of the inner ring side seal ring, the magnetic sensor is provided to be molded by the resin-made external member on the outer diameter side of the ring-like core metal of the outer ring side seal ring, the magnetic ring and the magnetic sensor are integrated to the seal apparatus and compact formation of the rotation detector is achieved.

The harness of the magnetic sensor is divided into the first harness connected to the magnetic sensor and the second harness connected to the electronic circuit of the is vehicle body, which are connected to each other via the connector provided at the knuckle. Therefore, since both of the rolling bearing apparatus and the knuckle are connected to a damper against swinging of the vehicle body in running, vibration of the vehicle body is not transmitted to the magnetic sensor fixed to the rolling bearing apparatus and the connector provided at the knuckle and the first harness connecting these is not disconnected by swinging of the vehicle body. However, since the electronic circuit provided at the vehicle body is vibrated by swinging of the vehicle body, there is a concern that the second harness connecting the connector provided at the knuckle and the electric circuit provided at the vehicle body is disconnected by swinging of the vehicle body. When the second harness is disconnected by swinging of the vehicle body in this way, by detaching only the second harness from the connector to interchange, maintenance can be carried out inexpensively and easily.

According to the invention, in a rolling bearing apparatus comprising an inner ring member constituting a rotating ring having a raceway surface, an outer ring member arranged to the inner ring member concentric therewith and constituting a fixed ring having a raceway surface in correspondence with the inner ring member, a rolling member interposed between the respective raceway surfaces of the inner ring member and the outer ring member and a rotation detector for detecting a state of rotating the inner ring member wherein the rotation detector comprises a magnetic sensor provided on a side of the outer ring member and a magnetic ring provided on a side of the inner ring member and the state of rotating the inner ring member is detected by detecting the magnetic ring by the magnetic sensor, and a harness of the magnetic sensor is divided into a first harness connected to the magnetic sensor and the second harness connected to an electronic circuit of a vehicle body and the first harness and the second harness are connected to each other via a connector provided at a knuckle for fixing the outer ring member.

As a rotation detector, there is used, for example, an active type detector for changing an output thereof in accordance with a change in a magnetic flux, a pulser ring is pointed out for the magnetic ring and a regular and reverse rotation detecting sensor constituted by two pieces of magnetic sensors arranged to separate from each other in a peripheral direction is pointed out for the magnetic sensor.

According to the rolling bearing apparatus of the invention, the harness of the magnetic sensor is divided into the first harness connected to the magnetic sensor and the second harness connected to the electronic circuit of the vehicle body, which are connected to each other via the connector provided at the knuckle. Therefore, since both of the rolling bearing apparatus and the knuckle are connected to a damper against swinging of the vehicle body in running, vibration of the vehicle body is not transmitted to the magnetic sensor fixed to the rolling bearing apparatus and the connector provided at the knuckle and the first harness connecting these is not disconnected by swinging of the vehicle body. However, since the electronic circuit provided at the vehicle body is vibrated by swinging of the vehicle body, there is a concern of disconnecting the second harness for connecting the connector provided at the knuckle and the electronic circuit provided at the vehicle body by swinging of the vehicle body. When the second harness is disconnected by swinging of the vehicle body in this way, by detaching only the second harness of the connector to interchange, maintenance can be carried out inexpensively and easily.

According to the invention, in a rolling bearing apparatus comprising an inner ring member constituting a fixed ring having a raceway surface, an outer ring member arranged to the inner ring member concentric therewith and constituting a rotating ring having a raceway surface in correspondence with the inner ring member, a rolling member interposed between the respective raceway surfaces of the inner ring member and the outer ring member, a seal apparatus for sealing a clearance between the inner ring member and the outer ring member and a rotation detector for detecting a state of rotating the outer ring member wherein the seal apparatus comprises an outer ring side seal ring fixed to the outer ring member and an inner ring side seal ring fixed to the inner ring member, and the rotation detector comprises a magnetic sensor provided at an outer peripheral surface of a ring-like core metal of the inner ring side seal ring and a magnetic ring provided at a side face in an axial direction of a ring-like core metal of the outer ring side seal ring and the state of rotating the outer ring member is detected by detecting the magnetic ring by the magnetic sensor.

The magnetic sensor is integrated to the ring-like core metal of the inner ring side seal ring by being molded by a resin-made external member wherein a labyrinth is formed between the resin-made external member and the ring-like core metal of the outer ring side seal ring.

As a rotation detector, for example, there is used an active type detector in which an output thereof is changed in accordance with a change in a magnetic flux, a pulser ring is pointed out for the magnetic ring and a regular and reverse rotation detecting sensor constituted by two pieces of magnetic sensors arranged to separate from each other in a peripheral direction or the like is pointed out for the magnetic sensor.

According to the rolling bearing apparatus of the invention, the magnetic ring is provided at the side face in the axial direction of the ring-like core metal of the outer ring side seal ring, the magnetic sensor is provided at the outer peripheral surface of the ring-like core metal of the inner ring side seal ring, the magnetic ring and the magnetic sensor are compactly integrated to the seal apparatus, further, a detecting face of the magnetic sensor and a detected face of the magnetic ring are arranged to be orthogonal to each other, an air gap is not needed therebetween as in an opposed arrangement thereof and compact formation of the rotation detector can be achieved.

The magnetic ring is fixed to the side face in the axial direction of the ring-like core metal of the outer ring side seal ring, further, the magnetic sensor is molded by the resin-made external member to integrate at the outer peripheral surface of the ring-like core metal of the inner ring side seal ring, the magnetic ring and the magnetic sensor are promoted in hermetically sealing performance and excellent in dust resistance performance.

A labyrinth is formed between the resin-made external member molded with the magnetic sensor and the ring-like core metal of the outer ring side seal ring and mud water or the like can be prevented from invading into a ring-like bearing space between the inner and the outer ring members from outside.

Figure 1:
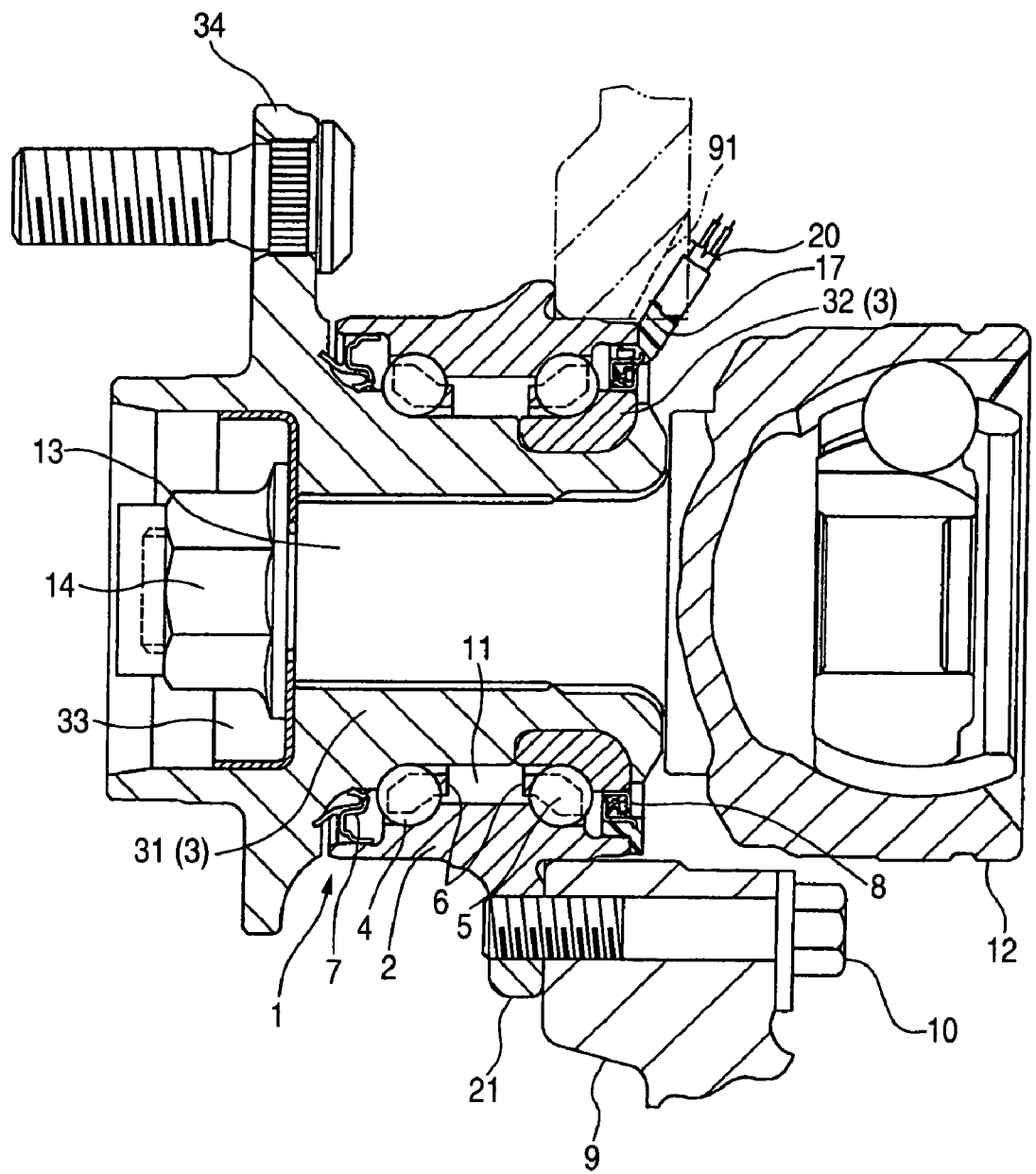
FIG. 1 is a sectional view showing a total constitution of a rolling bearing apparatus for a vehicle according to an embodiment of the invention.

In the drawings, a reference numeral 1 refers to a rolling bearing apparatus; 2 to an outer ring member; 3 to an inner ring member; 7,8 to a seal apparatus; 15 to a regular and reverse rotation detecting sensor (magnetic sensor); 16 to a pulser ring (magnetic ring); 17 to a resin-made external member; 20 to an harness; 81 to an outer ring side seal ring; 82 to an inner ring side seal ring; 101 to a rolling bearing apparatus; 102 to an outer ring member; 103 to an inner ring member; 107 to a seal apparatus; 115 to a regular and reverse rotation detecting sensor (magnetic sensor); 116 to a pulser ring (magnetic ring); 117 to a resin-made external member; 120 to an harness; 171 to an outer ring side seal ring; and 172 to an inner ring side seal ring.

DETAILED DESCRIPTION OF THE PREFERRED EMBODIMENTS

An embodiment of the invention will be explained in reference to FIGS. 1 through FIG. 7.

Figure 2:
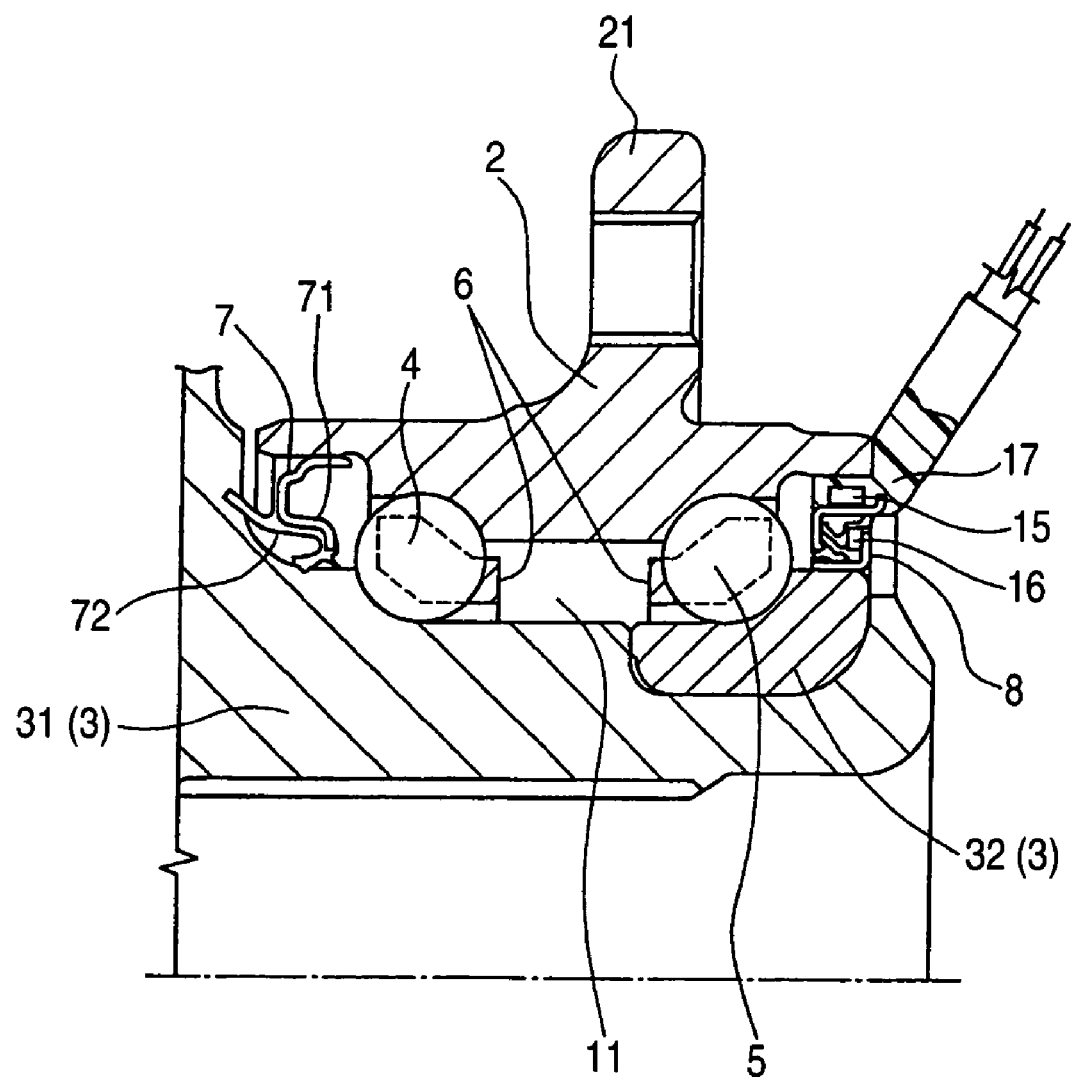
FIG. 2 is a sectional view enlarging an essential portion of FIG. 1.
Figure 3:
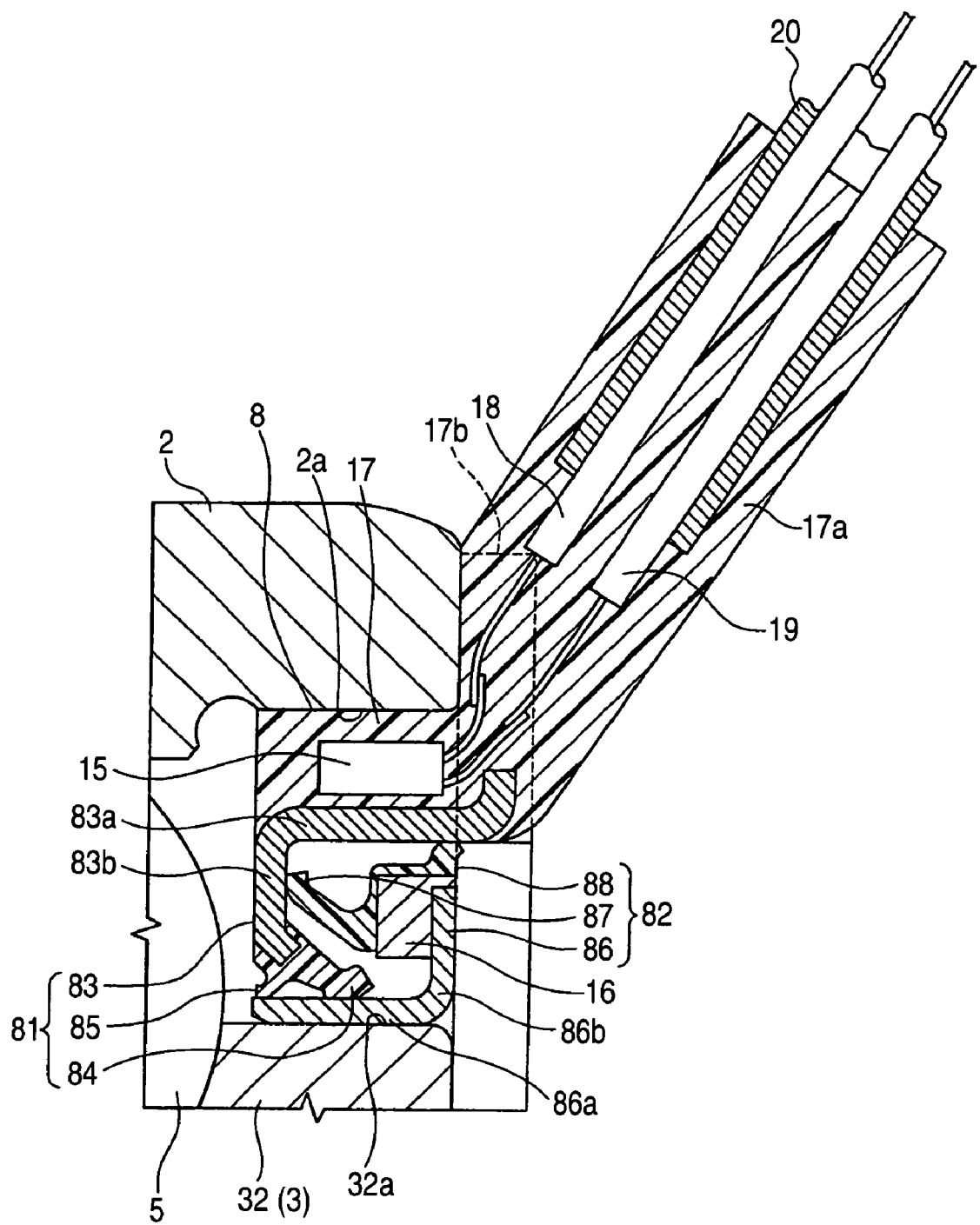
FIG. 3 is a sectional view enlarging a seal apparatus portion of FIG. 2.
Figure 4:
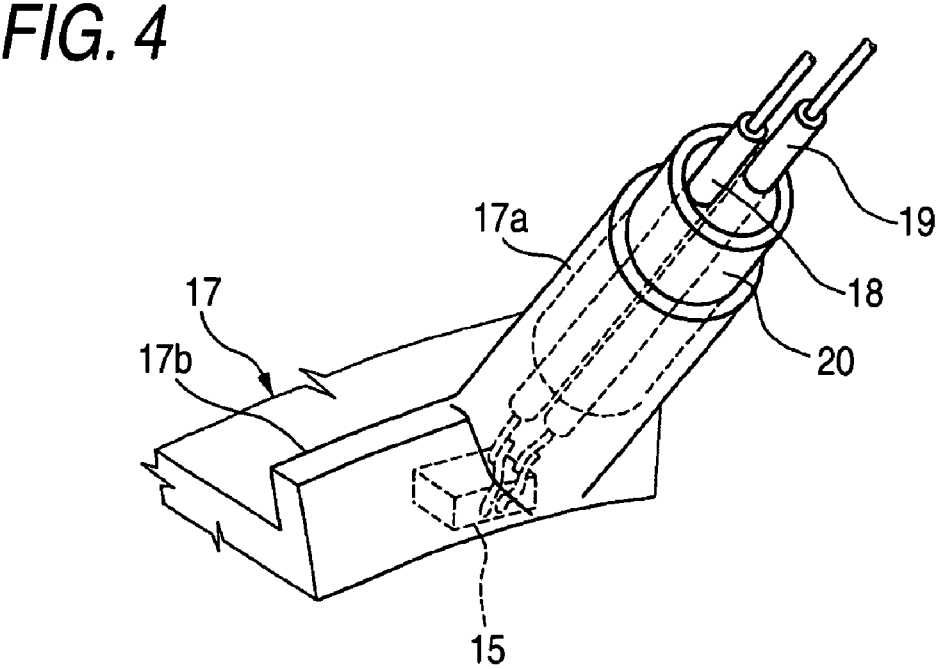
FIG. 4 is a perspective view enlarging the seal apparatus portion of FIG. 2.
Figure 5:
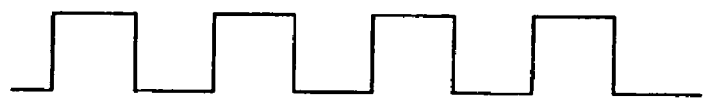
FIGS. 5(A) and 5(B) illustrate diagrams showing a phase relationship between detection signals of regular and reverse rotation detecting sensors according to the embodiment of the invention, respectively.
Figure 5:
Figure 6:
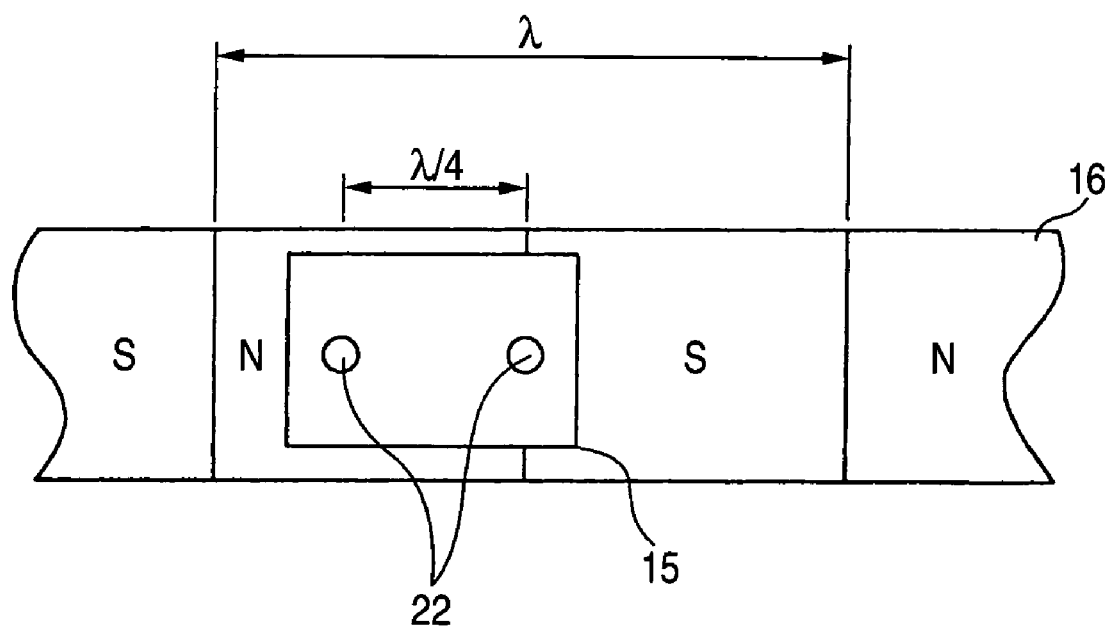
FIG. 6 is an explanative view of the regular and reverse rotation detecting sensor according to the embodiment of the invention.
Figure 7:
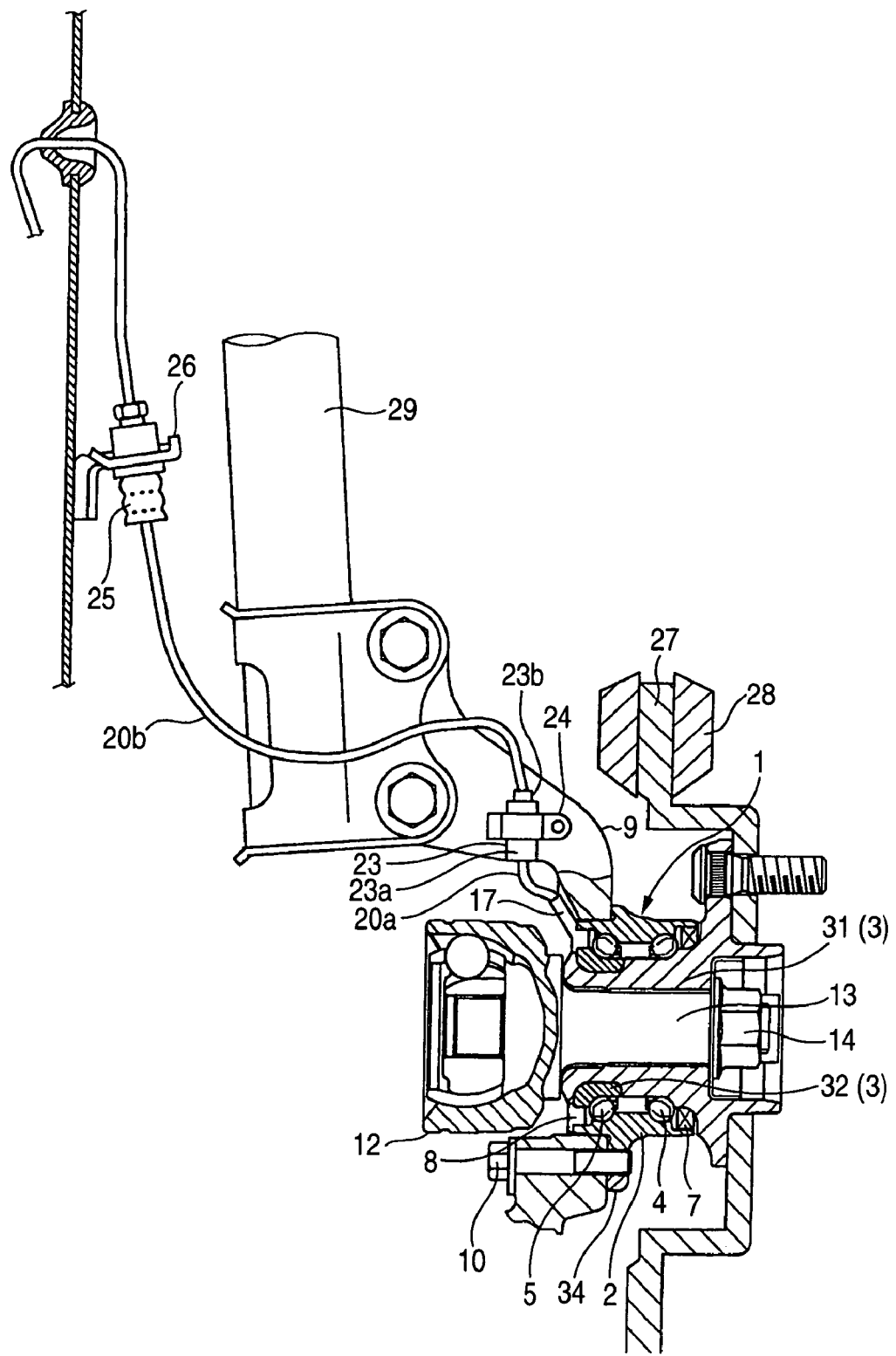
FIG. 7 is a sectional view of a driving wheel showing a structure of connecting a harness of the regular and reverse rotation detecting sensor according to the embodiment of the invention.

FIG. 1 is a sectional view showing a total constitution of a rolling bearing apparatus for a vehicle according to the embodiment, FIG. 2 is a sectional view enlarging an essential portion of FIG. 1, FIG. 3 is a sectional view enlarging a seal apparatus portion of FIG. 2, FIG. 4 is a perspective view enlarging the seal apparatus portion of FIG. 2, FIG. 5 illustrates diagrams showing a phase relationship between detection signals of two pieces of magnetic sensors, FIG. 6 is an explanatory view of a regular and reverse rotation detecting sensor and FIG. 7 is a sectional view of a driving wheel showing a structure of the regular and reverse rotation detecting sensor for connecting to a harness.

A rolling bearing apparatus 1 of the embodiment is used on a side of a driving wheel of an automobile and in FIG. 1, the left side constitutes a vehicle outer side and the right side constitutes a vehicle inner side.

An inner ring member 3 is rotatably supported by an outer ring member 2 unrotatably supported by a vehicle body side via a knuckle 9 around an axis core via two rows of balls (an example of rolling members) 4, 5 respectively arranged by crown type retainers 6 at equally distributed positions in a circumferential direction.

An outer peripheral surface of the outer ring member 2 is formed with a support flange 21 projected outwardly in a diameter direction and by fixing the support flange 21 to the knuckle 9 via an attaching bolt 10, the outer ring member 2 is unrotatably supported.

The inner ring member 3 is constituted by a hub wheel 31 and a cylindrical member 32 which is separate from the hub wheel 31 and fitted to attach to the vehicle inner side of a barrel portion of the hub wheel 31. A portion of an outer peripheral surface of the barrel portion of the hub wheel 31 is used as an inner ring raceway surface of the ball 4 of the row on the vehicle outer side and an outer peripheral surface of the cylindrical member 32 is used as an inner ring raceway surface of the ball 5 of the row of the vehicle inner side and an inner peripheral surface of the outer ring member 2 is formed with two outer ring raceway surfaces for the two rows of balls 4, 5.

There are provided seal apparatus 7, 8 for preventing a lubricant at inside of a ring-like bearing space 11 from leaking to outside and preventing mud water or the like from invading from outside by hermetically sealing the ring-like bearing space 11 between the outer ring member 2 and the inner ring member 3 on both sides in an axis core direction thereof.

Necessary pressure is applied to the two rows of balls 4, 5 and a bowl type outer ring member 12 is brought into a state of being integrated to rotate integrally with the inner ring member 3 by press-fitting a shaft portion 13 formed integrally with the bowl type outer ring member 12 of the constant-velocity joint to a center hole of the hub wheel 31 via a spline, screwing a nut 14 to an end portion on the vehicle outer side of the shaft portion 13 and fastening the nut 14 to an end face of a recess portion 33 of the hub wheel 31.

A middle of an outer peripheral surface of the hub wheel 31 is integrally formed with a hub flange 34 projected outwardly in the diameter direction. The hub flange 34 is attached with a brake disc rotor as well as a tire wheel and the tire wheel is attached with the wheel.

The seal apparatus 7 on the vehicle outer side is constituted by adhering a rubber-made lip 72 brought into sliding contact with the hub wheel 31 to a ring-like core metal 71 inwardly fitted to the outer ring member 2.

The seal apparatus 8 on the vehicle inner side is constituted by combining an outer ring side seal ring 81 and an inner ring side seal ring 82.

The outer ring side seal ring 81 is attached to a side of the outer ring member 2 and is constituted to attach a main lip 84 and an auxiliary lip 85 to cover a ring-like core metal 83. The ring-like core metal 83 includes a cylindrical portion 83a along an axial direction and a ring-like plate portion 83b constituted by folding to bend an inner end side in the axial direction of the cylindrical portion 83a inwardly in the diameter direction.

The inner ring side seal ring 82 is attached to a side of the cylindrical member 32 and is constituted to attach an axial direction lip 87 and a diameter direction lip 88 to cover a ring-like core metal 86. The ring-like core metal 86 includes a cylindrical portion 86a along the axial direction and a ring-like plate portion 86b constituted by bending an outer end side in the axial direction of the cylindrical portion 86a outwardly in the diameter direction.

Further, the respective lips 84, 85, 87, 88 are constituted by rubber of nitril butadiene rubber (NBR) or the like and are vulcanized to adhere to the ring-like core metals 83, 86. Further, the ring-like core metal 83 of the outer ring side seal ring 81 is formed by a nonmagnetic material of, for example, stainless steel or the like.

Further, the outer ring side seal ring 81 is integrally assembled with a regular and reverse rotation detecting sensor 15 constituting a magnetic sensor, the inner ring side seal ring side 82 is integrally assembled with a pulser ring 16 constituting a magnetic ring respectively, and rotation of the cylindrical member 32 is detected by the regular and reverse rotation detecting sensor 15 and the pulser ring 16.

The regular and reverse rotation detecting sensor 15 is a sensor constituted by two pieces of magnetic sensors each comprising a Hall element, a magnetoresistive element or the like and arranged to separate in the circumferential direction and capable of detecting a rotational direction in addition to a rotational angle. With regard to a phase relationship between detection signals of two pieces of the magnetic sensors, as shown by FIG. 5, the sensors are arranged such that when one of the magnetic sensors outputs a retangular wave signal of FIG. 5(A), other of the magnetic sensors outputs a retangular wave signal of FIG. 5(B) the phase of which is shifted by 90 degrees. The rotational direction of right direction or left direction can be determined by advancement and retardation of the two magnetic sensors.

As shown by FIG. 6, a Hall IC including two pieces of Hall elements 22 may be used for the regular and reverse rotation detecting sensor 15. That is, the rotational direction is made to be able to detect by arranging two pieces of the Hall elements 22 at an interval ($\lambda/4$) between respective output phases by 90 degrees relative to a magnetizing pitch of $\lambda$ of the pulser ring 16.

The regular and reverse rotation detecting sensor 15 is mounted in non-contact above the outer peripheral surface of the cylindrical portion 83a of the ring-like core metal 83 of the outer ring side seal ring 81 and is provided by integrally molding (insert molding) a resin-made external member 17 having a thickness of covering the regular and reverse rotation detecting sensor 15 to the outer diameter of the cylindrical portion 83a. The resin-made external member 17 is constituted by an engineering plastic of, for example, poly-phenylene-sulphide (PPS), poly-butylene-terephthalate (PBT), poly-amide (PA) or the like.

The regular and reverse rotation detecting sensor 15 is connected with signal lines 18, 19 and the signal lines 18, 19 are bundled and covered by a harness 20 comprising an insulating pipe. The harness 20 is extended in an outer diameter direction and the knuckle 9 is formed with a notch 91 for passing the harness 20.

Further, the resin-made external member 17 is integrally provided with a guiding projected portion 17a in which the harness 20 is embedded and a flange 17b for positioning the regular and reverse rotation detecting sensor 15 in the axial direction in a state of attaching the outer ring side seal ring 81 to the outer ring member 2.

The pulser ring 16 is formed by vulcanizing and molding rubber including a magnetic powder and is magnetized in a mode of, for example, aligning N poles and S poles alternately in the peripheral direction. The pulser ring 16 is fixed to a position capable of detecting a change in the magnetic field of the pulser ring 16 by the regular and reverse rotation detecting sensor 15 on the inner peripheral surface of the ring-like core metal 86 of the inner ring side seal ring 82.

Further, a sensing direction (inner diameter direction) of the regular and reverse rotation detecting sensor 15 and a magnetized direction (axial direction) of the pulser ring 16 are orthogonal to each other.

Meanwhile, the seal apparatus 8 on the vehicle inner side is attached thereto in a tight fit state by press-fitting the resin-made external member 17 to a shoulder portion 2a of the inner peripheral surface of the outer ring member 2 with regard to the outer ring side seal ring 81 integrated with the regular and reverse rotation detecting sensor 15 and press-fitting the ring-like core metal 86 to a shoulder portion 32a of the outer peripheral surface of the cylindrical member 32 with regard to the inner ring side seal ring 82 integrated with the pulser ring 16, respectively, in a state of combining the outer ring side seal ring 81 and the inner ring side seal ring 82.

The connection of the harness of the regular and reverse rotation detecting sensor 15 will be explained in reference FIG. 7. Further, FIG. 7 shows a front axle of an FF vehicle.

The harness 20 of the regular and reverse rotation detecting sensor 15 is divided into a first harness 20a connected to the regular and reverse rotation detecting sensor 15 and the second harness 20b connected to an electronic circuit of a vehicle body. The first harness 20a is guided to a side face of an arm portion of the knuckle 9 by passing the notch 91.

The first harness 20a and the second harness 20b are connected by connecting connectors 23 provided at respective front ends thereof. Further, the connector 23a at the front end of the first harness 20a is fixed to the knuckle 9 for fixing the outer ring member 2 by a connector bracket 24 and the connector 23b at the front end of the second harness 20b is connected attachably and detachably to and from the connector 23a of the first harness 20a.

The second harness 20b is fixed to the vehicle body via a protector 25 and a protector bracket 26 and connected to the electronic circuit.

Further, numeral 27 designates a brake disc, numeral 28 designates a brake pad and numeral 29 designates a shock absorber.

According to the rolling bearing apparatus 1, the outer ring member 2 is unrotatably arranged to fix thereto and when the inner ring member 3 is rotated, respective magnetic poles of the pulser ring 16 integrally rotated with the inner ring member 3 are successively opposed to two pieces of the magnetic sensors of the regular and reverse rotation detecting sensor 15. At this occasion, positions of the pulser ring 16 opposed to the regular and reverse rotation detecting sensor 15 are successively changed and therefore, directions of magnetic fluxes generated from the pulser ring 16 are alternately changed and therefore, alternating current voltage is outputted from the regular and reverse rotation detecting sensor 15. A waveform period of the alternating current voltage is changed in accordance with a rotational phase and a rotational speed of the pulser ring. By subjecting the alternating current voltage to waveform processing, the rotational phase, the rotational speed, the rotational number, the rotational direction and the like of the inner ring member 3 are calculated.

According to the rolling bearing apparatus 1 constituted in this way, the rotational speed and the rotational direction of the axle can be detected by the regular and reverse rotation detecting sensor 15.

The pulser ring 16 is fixed to the inner face of the ring-like core metal 86 of the inner ring side seal ring 82, further, the regular and reverse rotation detecting sensor 15 is molded to integrate to the resin-made external member 17 on a side of the outer diameter of the ring-like core metal 83 of the outer ring side seal ring 81 and the pulser ring 16 and the regular and reverse rotation detecting sensor 15 are promoted in the hermetically sealing performance and excellent in the dust resistance performance.

The pulser ring 16 is provided at the inner face of the ring-like core metal 86 of the inner ring side seal ring 82, the regular and reverse rotation detecting sensor 15 is provided to be molded by the resin-made external member 17 on the outer diameter side of the ring-like core metal 83 of the outer ring side seal ring 81, the pulser ring 16 and the regular and reverse rotation detecting sensor 15 are integrated to the seal apparatus, compact formation of the rotation detector is achieved and the rotation detector can easily be installed even in the small space such as a space on the side of the driving wheel.

The harness 20 of the regular and reverse rotation detecting sensor 15 is divided into the first harness 20a connected to the regular and reverse rotation detecting is sensor 15 and the second harness 20b connected to the electronic circuit of the vehicle body, which are connected to each other via the connector 23 provided at the knuckle 9. Therefore, since both of the rolling bearing apparatus 1 and the knuckle 9 are connected to a damper against swinging of the vehicle body in running, vibration of the vehicle body is not transmitted to the regular and reverse rotation detecting sensor 15 fixed to the rolling bearing apparatus 1 and the connector 23 provided at the knuckle 9 and the first harness 20a connecting these is not disconnected by swinging of the vehicle body. However, since the electronic circuit provided at the vehicle body is vibrated by swinging of the vehicle body, there is a concern of disconnecting the second harness 20b connecting the connector 23 provided at the knuckle 9 and the electronic circuit provided at the vehicle body by swinging of the vehicle body. When the second harness 20b is disconnected by swinging of the vehicle body in this way, by detaching the connector 23b of the second harness 20b from the connector 23a of the first harness 20a to interchange, it is not necessary to interchange a total of a hub unit including the bearing apparatus, further, the regular and reverse rotation detecting sensor 15 can be utilized without being interchanged and maintenance can be carried out inexpensively and easily.

The regular and reverse rotation detecting sensor 15 over to the harness 20 is molded by the resin-made external member 17 and connecting portions of the regular and reverse rotation detecting sensor 15 and the signal lines 18, 19 are reinforced and disconnection can be prevented.

Other embodiment of the invention will be explained in reference to FIG. 8 and FIG. 9.

Figure 8:
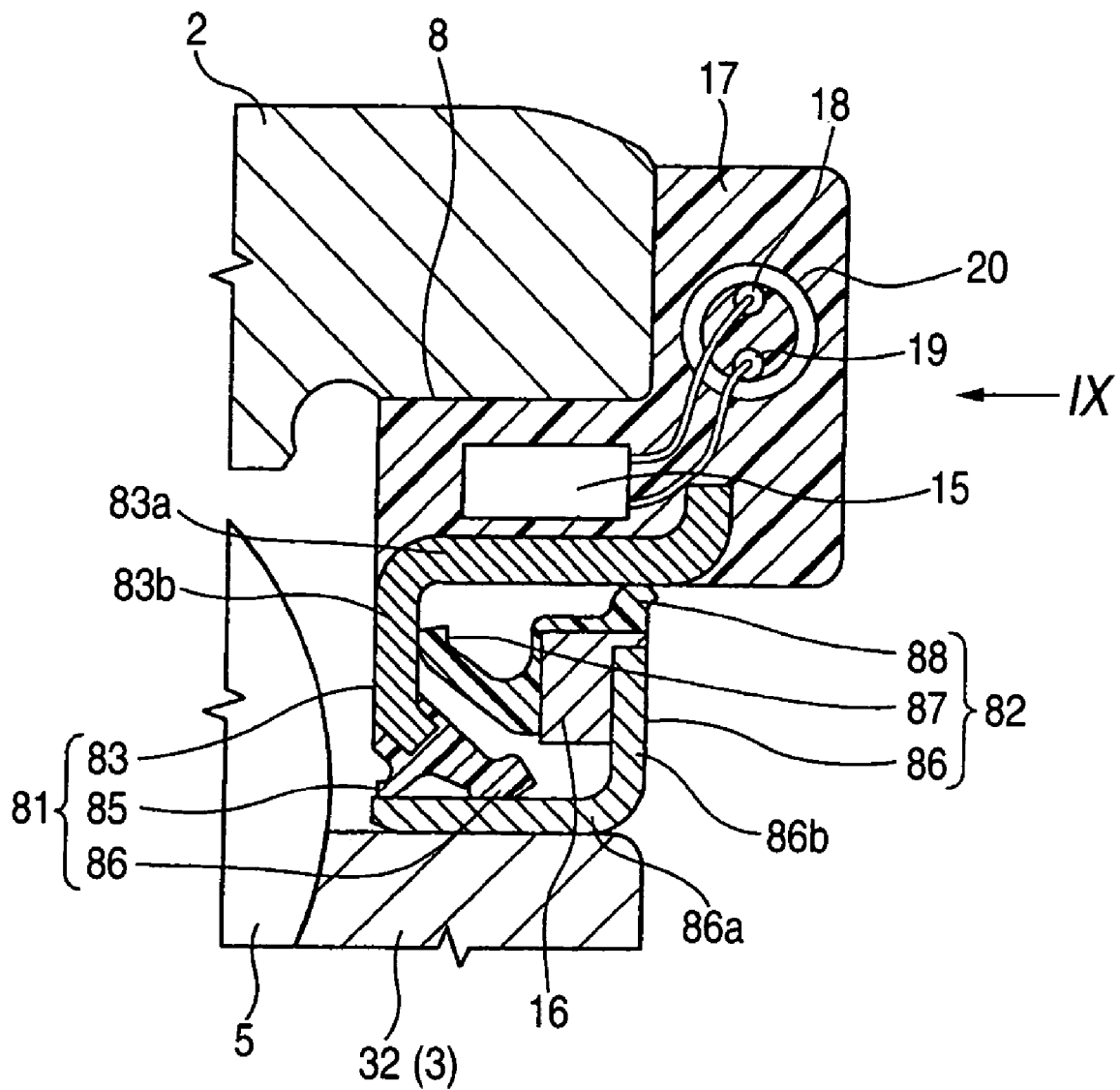
FIG. 8 is a sectional view enlarging a seal apparatus portion of a rolling bearing apparatus according to other embodiment of the invention.
Figure 9:
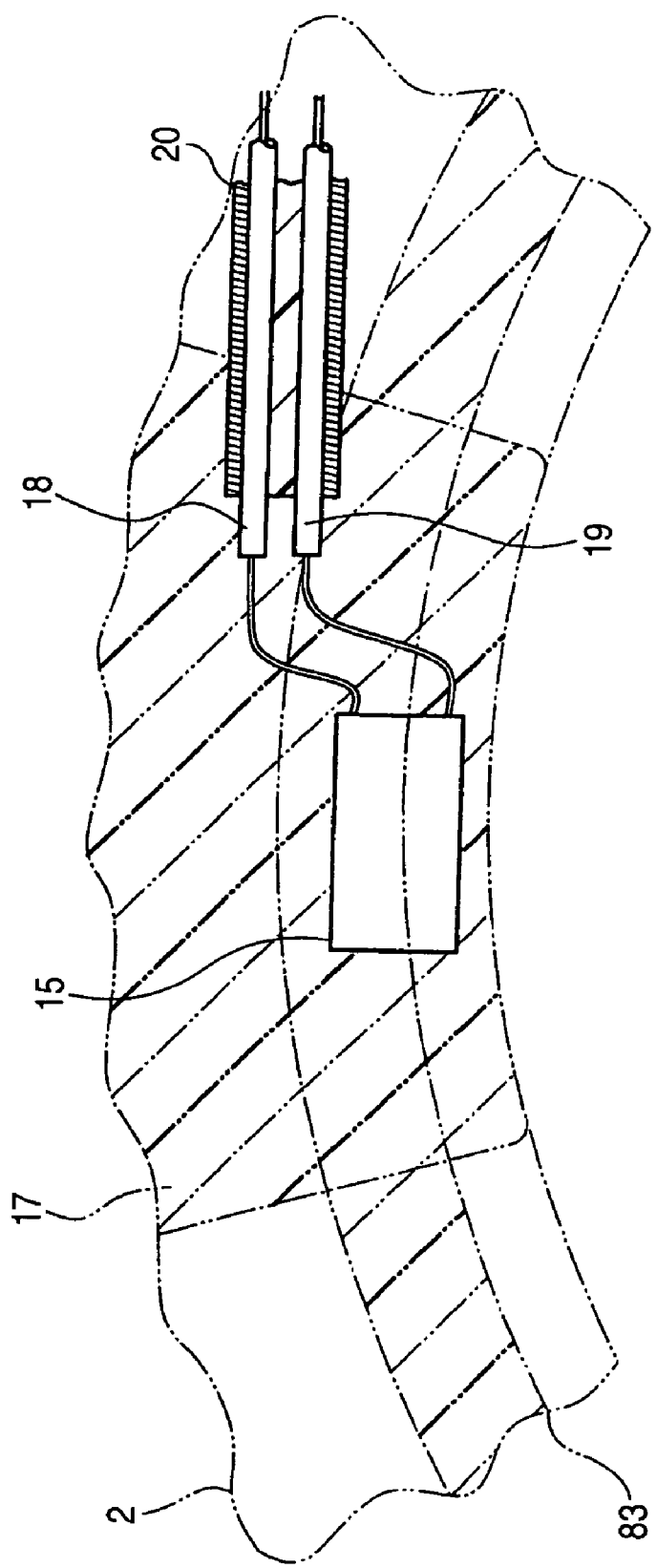
FIG. 9 is a view viewing FIG. 8 in a IX arrow mark direction.

FIG. 8 is a sectional view enlarging a seal apparatus portion of a rolling bearing apparatus according to the embodiment and FIG. 9 is a view viewing FIG. 8 in a IX arrow mark direction.

Further, a total constitution of the rolling bearing apparatus is similar to that of FIG. 1, the same portions are attached with the same notations and an explanation thereof will be omitted.

The rolling bearing apparatus of the embodiment is characterized in that the harness 20 of the regular and reverse rotation detecting sensor 15 is extended in a peripheral direction. That is, the first harness 20a is led out by passing the inner peripheral surface of the knuckle 9 and the connector 23a of the front end of the first harness 20a is fixed to the knuckle 9 by the connector bracket 24.

Even in the rolling bearing apparatus constituted in this way, an effect similar to that of the embodiment shown in FIG. 1 through FIG. 7 is achieved.

Further, the harness 20 is extended in the peripheral direction to avoid the knuckle 9 and when the bearing apparatus is fixed to the knuckle 9, the harness 20 and the knuckle 9 do not interfere with each other and integration performance is promoted.

Further, in the above-described respective embodiments, the harness 20 may not be divided and may connect the regular and reverse rotation detecting sensor and the electronic circuit of the vehicle body.

Further, the invention may be applied to the driven wheel side.

Another embodiment of the invention will be explained in reference to FIGS. 10 through FIG. 17.

Figure 10:
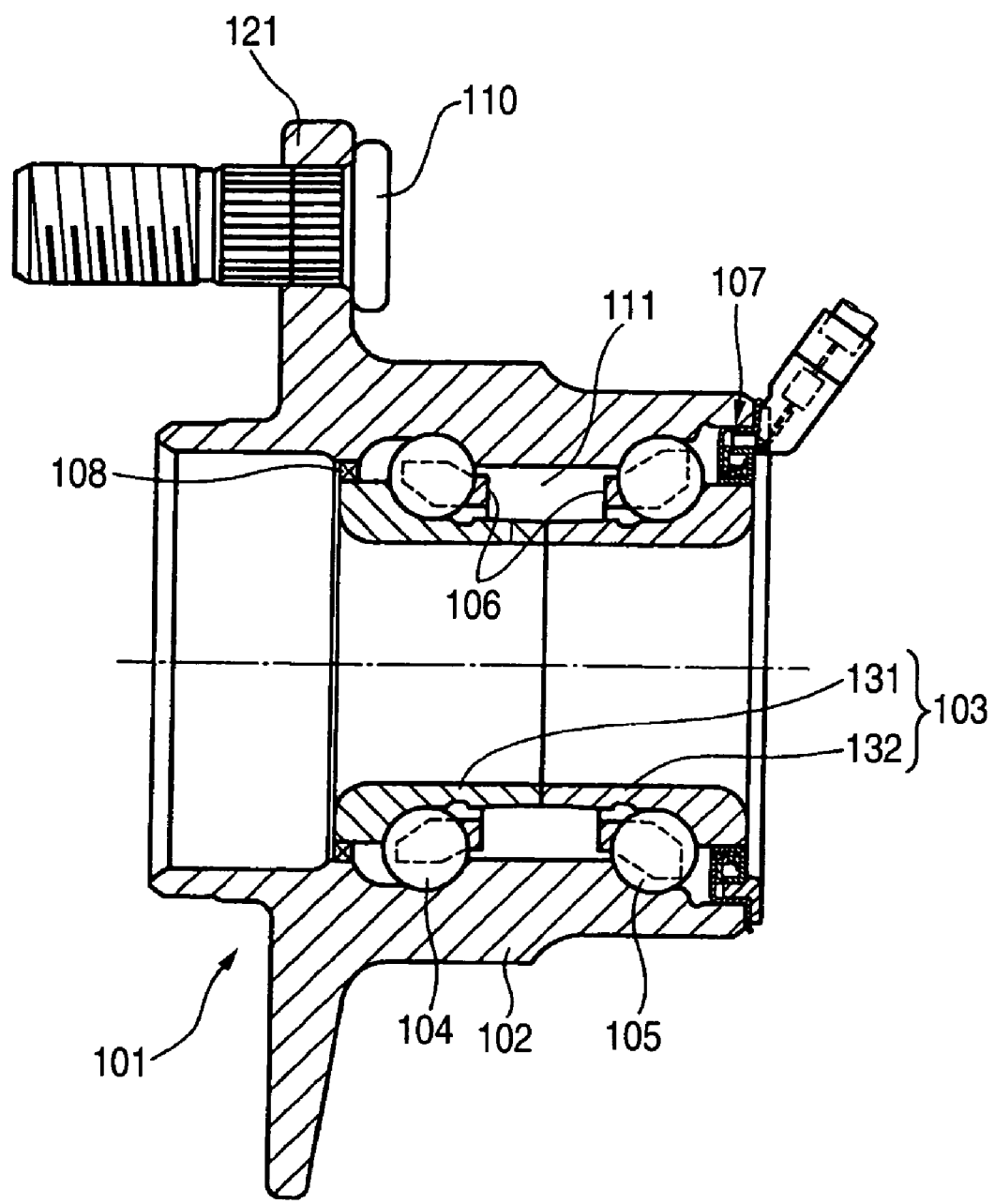
FIG. 10 is a sectional view showing a total constitution of a rolling bearing apparatus for a vehicle according to an embodiment of the invention.
Figure 11:
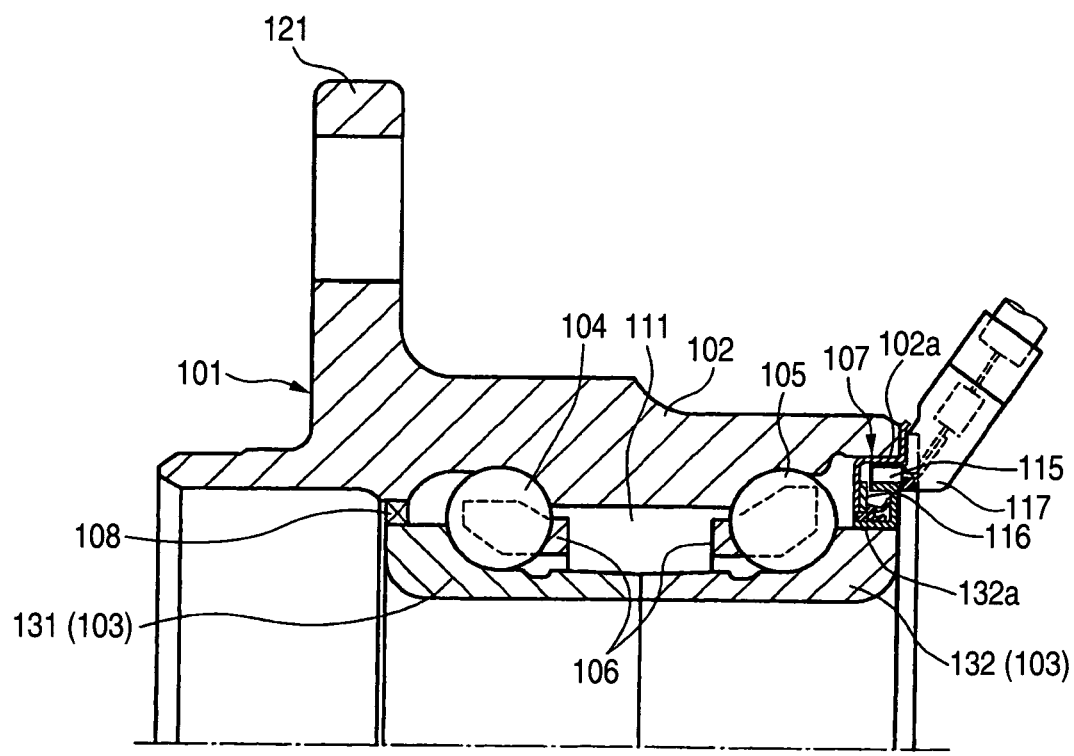
FIG. 11 is a sectional view enlarging an essential portion of FIG. 10.
Figure 12:
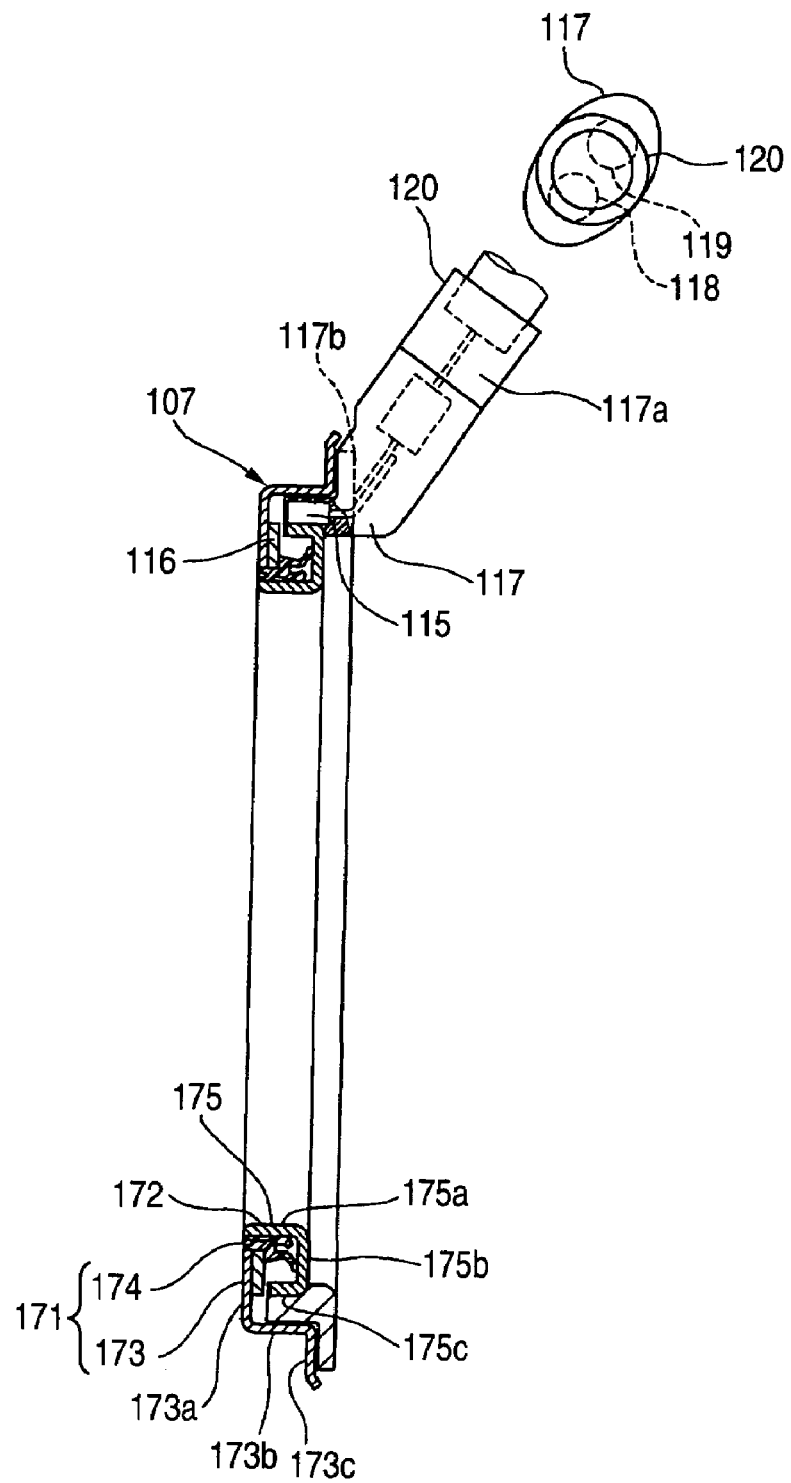
FIG. 12 is a sectional view of a seal apparatus portion of FIG. 11.
Figure 13:
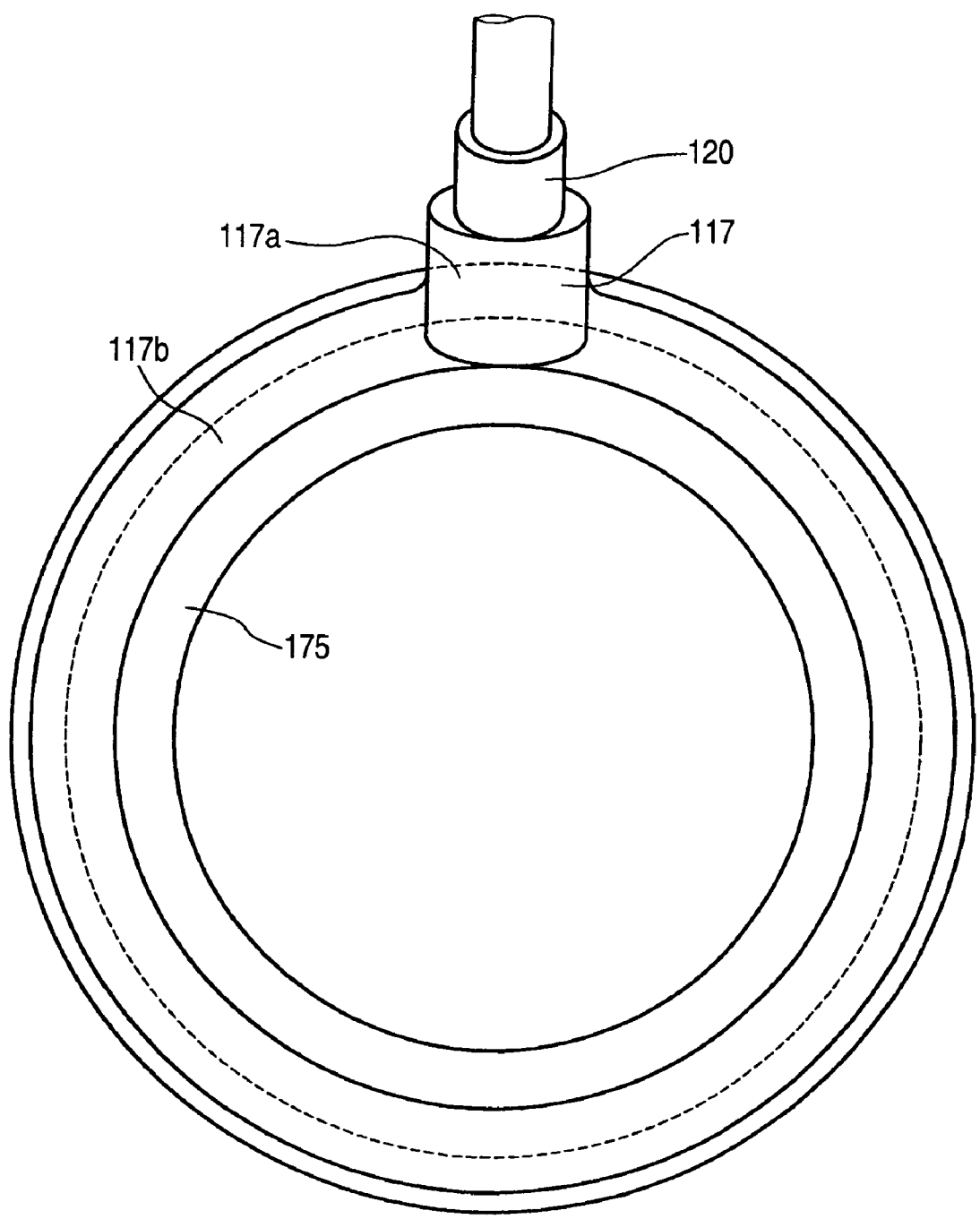
FIG. 13 is a front view of the seal apparatus portion of FIG. 11.
Figure 14:
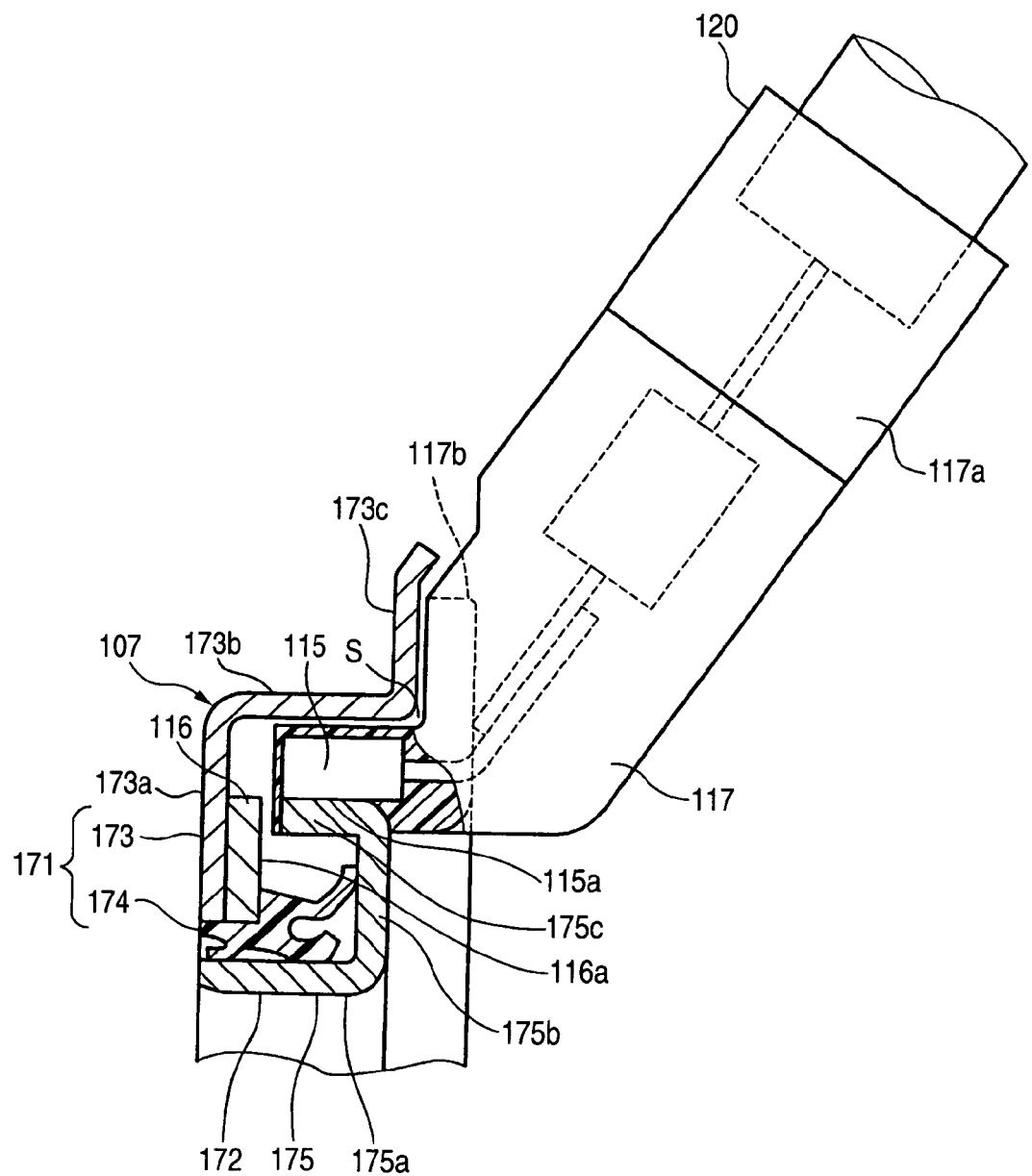
FIG. 14 is a sectional view partially enlarging the seal apparatus portion of FIG. 11.
Figure 15:
FIGS. 15(A) and 15(B) illustrate diagrams showing a phase relationship between detection signals of a regular and reverse rotation detecting sensor according to the embodiment of the invention, respectively.
Figure 15:
Figure 16:
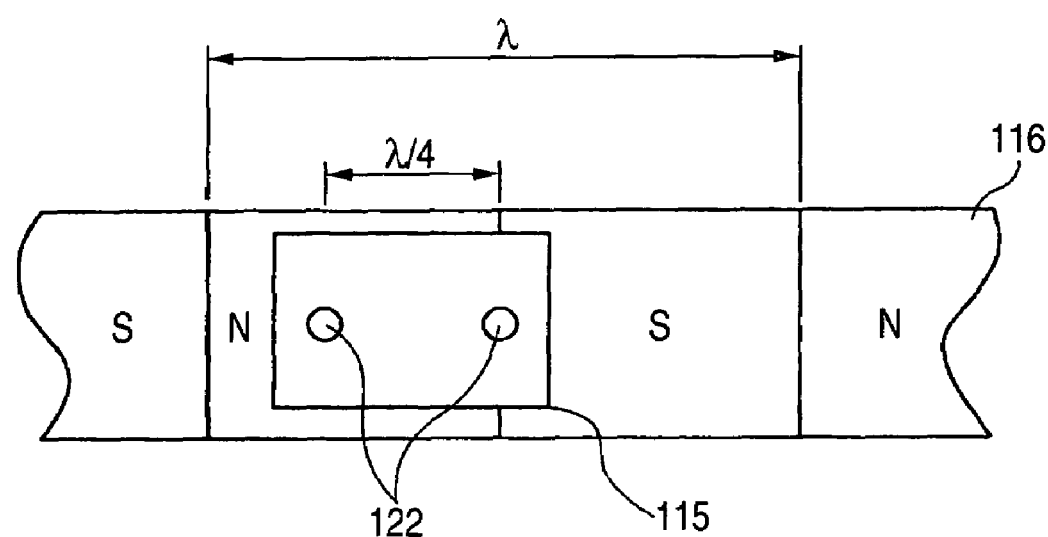
FIG. 16 is an explanatory view of the regular and reverse rotation detecting sensor according to the embodiment of the invention.
Figure 17:
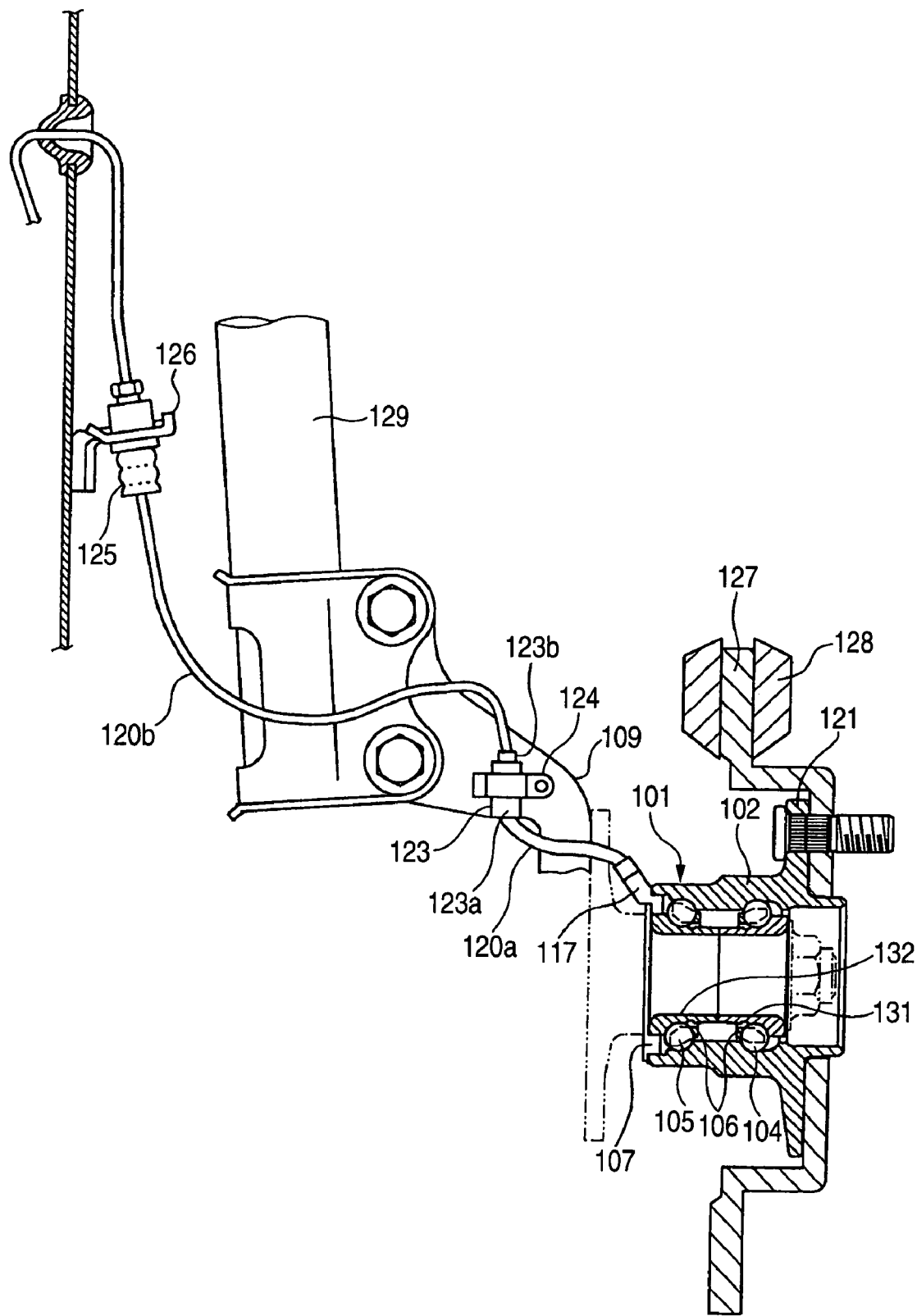
FIG. 17 is a sectional view of a driven wheel showing a structure of connecting a harness of the regular and reverse rotation detecting sensor according to the embodiment of the invention.

FIG. 10 is a sectional view showing a total constitution of a rolling bearing apparatus for a vehicle according to the embodiment, FIG. 11 is a sectional view enlarging an essential portion of FIG. 10, FIG. 12 is a sectional view of a seal apparatus portion of FIG. 11, FIG. 13 is a front view of the seal apparatus portion of FIG. 12, FIG. 14 is a sectional view partially enlarging the seal apparatus portion of FIG. 12, FIG. 15 illustrates diagrams showing a phase relationship between detection signals of two pieces of magnetic sensors, FIG. 16 is an explanatory view of a regular and reverse rotation detecting sensor and FIG. 17 is a sectional view of a driving wheel showing a structure of connecting a harness of the regular and reverse rotation detecting sensor.

A rolling bearing apparatus 101 of the embodiment is used on a side of a driving wheel of an automobile and in FIG. 10, the left side constitutes a vehicle outer side and the right side constitutes a vehicle inner side.

An outer ring member 102 is supported by an inner ring member 103 unrotatbly supported by a side of a vehicle body rotatably around an axis core via two rows of balls (an example of rolling member) 104, 105 arranged at positions equally distributed in a circumferential direction respectively via crown type retainers 106.

An inner peripheral surface of the outer ring member 102 is formed with a pair of outer ring raceway surfaces for the two rows of balls 104, 105. An outer peripheral surface of the outer ring member 102 is formed with a support flange 121 projected outwardly in a diameter direction and by fixing the support flange 121 to the knuckle 109 via an attaching bolt 110, the outer ring member 102 is unrotatably supported.

The inner ring member 103 is constituted by a pair of inner rings 131, 132 formed in inner ring raceway surfaces of the respective rows of balls 104, 105.

There are provided seal apparatus 107, 108 for preventing a lubricant at inside of a ring-like bearing space 111 from leaking to outside and preventing mud water is or the like from invading from outside by hermetically sealing the ring-like bearing space 111 between the outer ring member 102 and the inner ring member 103 on both sides in an axial direction thereof.

The seal apparatus 107 on the vehicle inner side is constituted by combining an outer ring side seal ring 171 and an inner ring side seal ring 172.

The outer ring side seal ring 171 is attached to a side of the outer ring member 102 and is constituted to attach a lip 174 to cover a ring-like core metal 173. The ring-like core metal 173 includes a ring-like plate portion 173a, a cylindrical portion 173b constituted by bending an outer end side in a diameter direction of the ring-like plate portion 173a outwardly in the axial direction and a ring-like plate portion 173c constituted by bending an outer end side in the axial direction of the cylindrical portion 173a outwardly in the diameter direction. Further, the ring-like plate portion 173c is brought into contact with one end face on the vehicle inner side of the outer ring member 102 and the cylindrical portion 173b is press-fitted to a shoulder portion 102a of the outer ring member 102.

The inner ring side seal ring 172 is attached to a side of the inner ring 132 and is constituted by a ring-like core metal 175 comprising a cylindrical portion 175a along the axial direction, a ring-like plate portion 175b constituted by bending an outer end side in the axial direction of the cylindrical portion 175a outwardly in a diameter direction and a cylindrical portion 175c constituted by bending an outer end side in the diameter direction of the ring-like plate portion 175b inwardly in the axial direction. Further, the cylindrical portion 175a is press-fitted to a shoulder portion 32a of the inner ring 132.

Further, the lip 174 is constituted by rubber of nitril butadiene rubber (NBR) or the like and is vulcanized to adhere to the ring-like core metal 173. Further, the ring-like core metal 175 of the inner ring side seal ring 172 is formed by a nonmagnetic material of, for example, stainless steel or the like.

Further, a regular and reverse rotation detecting sensor 115 constituting a magnetic sensor is integrally assembled to the inner ring side seal ring 172 and a pulser ring 116 constituting a magnetic ring with integrally assembled to the outer ring side seal ring 171, respectively, and rotation of the outer ring member 102 is detected by the regular and reverse rotation detecting sensor 115 and the pulser ring 116.

The regular and reverse rotation detecting sensor 115 is a sensor constituted by two pieces of magnetic sensors each comprising a Hall element, a magnetoresistive element or the like and arranged to separate from each is other in the circumferential direction and capable of detecting a rotational direction in addition to a rotational angle. With regard to a phase relationship between detection signals of two pieces of the magnetic sensors, as shown by FIGS. 15(A) and 15(B), the sensors are arranged such that when one of the magnetic sensors outputs a rectangular wave signal of FIG. 15(A), other of the magnetic sensors outputs a rectangular wave signal of FIG. 15(B) the phase of which is shifted by 90 degrees. The rotational direction of right direction or left direction can be determined by advancement and retardation of the two magnetic sensors.

As shown by FIG. 16, a Hall IC including two pieces of Hall elements 122 may be used for the regular and reverse rotation detecting sensor 115. That is, the rotational direction is made to be able to detect by arranging two pieces of the Hall elements 122 at an interval ($\lambda/4$) between respective output phases by 90 degrees relative to a magnetizing pitch of $\lambda$ of the pulser ring 116.

The regular and reverse rotation detecting sensor 115 is mounted above the outer peripheral surface of the cylindrical portion 175c of the ring-like core metal 175 of the inner ring side seal ring 172 and is provided by integrally molding (insert molding) a resin-made external member 117 having a thickness of covering the regular and reverse rotation detecting sensor 115 to the outer diameter of the cylindrical portion 175c. The resin-made external member 117 is constituted by an engineering plastic of, for example, poly-phenylene-sulphide (PPS), poly-butylene-terephthalate (PBT), poly-amide (PA) or the like.

The regular and reverse rotation detecting sensor 115 is connected with signal lines 118, 119 and the signal lines 118, 119 are bundled and covered by a harness 120 comprising an insulating pipe. The harness 120 is extended in an outer diameter direction.

Further, the resin-made external member 117 is integrally provided with a guiding projected portion 117a in which the harness 120 is embedded and a flange 117b for positioning the regular and reverse rotation detecting sensor 115 in the axial direction in a state of attaching the outer ring side seal ring 172 to the inner ring member 132.

The pulser ring 116 is formed by vulcanizing to mold rubber including a magnetic powder and is magnetized in a mode of, for example, aligning N poles and S poles alternately in the peripheral direction. The pulser ring 116 is fixed to a position of the side face in the axial direction of the ring-like plate portion 173a of the ring-like core metal 173 of the outer ring side seal ring 171 capable of detecting a change in a magnetic field of the pulser ring 116 by the regular and reverse rotation detecting sensor 115. Further, a detecting face (inner diameter direction) 115a of the regular and reverse rotation detecting sensor 115 and a detected face (axial direction) 116a of the pulser ring 116 are orthogonal to each other.

Meanwhile, the seal apparatus 107 on the vehicle inner side is attached thereto in a tight fit state by press-fitting the ring-like core metal 175 to the shoulder portion 32a of the outer peripheral surface of the inner ring 132 with regard to the inner ring side seal ring 172 integrated with the regular and reverse rotation detecting sensor 115, further, press-fitting the ring-like core metal 173 to the shoulder portion 102a of the inner peripheral surface of the outer ring member 102 with regard to the outer ring side seal ring 171 integrated with the pulser ring 116, respectively, in a state of combining the outer ring side seal ring 171 and the inner ring side seal ring 172. Further, a labyrinth S is formed from the cylindrical portion 173b over to the ring-like plate portion 173c between the resin-made external member 117 and the ring-like core metal 173 of the outer ring side seal ring 171.

An explanation will be given of connection of the harness 120 of the regular and reverse rotation detecting sensor 115 in reference to FIG. 17. The harness 120 of the regular and reverse rotation detecting sensor 115 is divided into a first harness 120a connected to the regular and reverse detecting rotation 115 and a second harness 120b connected to an electronic circuit of a vehicle body.

The first harness 120a and the second harness 120b are connected by connecting connectors 123 provided at respective front ends thereof. Further, the connector 123a at the front end of the first harness 120a is fixed to the knuckle 109 for fixing the outer ring member 102 by a connector bracket 124 and the connector 123b at the front end of the second harness 120b is connected attachably and detachably to and from the connector 123a of the first harness 120a.

The second harness 120b is fixed to the vehicle body via a protector 125 and a protector bracket 126 and connected to the electronic circuit.

Further, numeral 127 designates a brake disc, numeral 128 designates a brake pad and numeral 129 designates a shock absorber.

According to the rolling bearing apparatus 101, the inner ring member 103 is unrotatably arranged to fix thereto and when the outer ring member 102 is rotated, respective magnetic poles of the pulser ring 116 integrally rotated with the outer ring member 102 are successively opposed to two pieces of the magnetic sensors of the regular and reverse rotation detecting sensor 115. At this occasion, positions of the pulser ring 116 opposed to the regular and reverse rotation detecting sensor 115 are successively changed and therefore, directions of magnetic fluxes generated from the pulser ring 116 are alternately changed and therefore, alternating current voltage is outputted from the regular and reverse rotation detecting sensor 115. A waveform period of the alternating current voltage is changed in accordance with a rotational phase and a rotational speed of the pulser ring. By subjecting the alternating current voltage to waveform processing, the rotational phase, the rotational speed, the rotational number, the rotational direction and the like of the inner ring member 103 are calculated.

According to the rolling bearing apparatus 101 constituted in this way, the pulser ring 116 is provided at the side face in the axial direction of the ring-like plate portion 173a of the ring-like core metal 173 of the outer ring side seal ring 171, the regular and reverse rotation detecting sensor 115 is provided at the outer peripheral surface of the cylindrical portion 175c of the ring-like core metal 175 of the inner ring side seal ring 172, the pulser ring 116 and the regular and reverse rotation detecting sensor 115 are compactly integrated to the seal apparatus 107, further, the detecting face 116a of the regular and reverse rotation detecting sensor 115 and the detected face 116a of the pulser ring 116 are arranged to be orthogonal to each other, an air gap is not needed therebetween as in the opposed arrangement and a compact formation of the rotation detector can be achieved.

The pulser ring 116 is fixed to the side face in the axial direction of the ring-like plate portion 173a of the ring-like core metal 173 of the outer ring side seal ring 171, further, the regular and reverse rotation detecting sensor 115 is molded by the resin-made external member 117 to integrate at the outer peripheral surface of the cylindrical portion 175c of the ring-like core metal 175 of the inner ring side seal ring 172 and the pulser ring 116 and the regular and reverse rotation detecting sensor 115 are promoted in hermetically sealing performance and excellent in dust resistance performance.

The labyrinth S is formed between the resin-made external member 117 molded with the regular and reverse rotation detecting sensor 115 and the cylindrical portion 173b and the ring-like plate portion 173c of the ring-like core metal 173 of the outer ring side seal ring 171 and mud water or the like can be prevented from invading into the ring-like bearing space 111 between the inner and the outer ring members 102, 103 from outside.

The rotational speed and the rotational direction of the outer ring member can be detected by the regular and reverse rotation detecting sensor 115.

The harness 120 of the regular and reverse rotation detecting sensor 115 is divided into the first harness 120a connected to the regular and reverse rotation detecting sensor 115 and the second harness 120b connected to the electronic circuit of the vehicle body, which are connected to each other via the connector 123 provided at the knuckle 109. Therefore, since both of the rolling bearing apparatus 101 and the knuckle 109 are connected to a damper against swinging of the vehicle body in running, vibration of the vehicle body is not transmitted to the regular and reverse rotation detecting sensor 115 fixed to the rolling bearing apparatus 101 and the connector 123 provided at the knuckle 109 and the first harness 120a connecting these is not disconnected by swinging of the vehicle body. However, since the electronic circuit provided at the vehicle body is vibrated by swinging of the vehicle body, there is a concern of disconnecting the second harness 120b connecting the connector 123 provided at the knuckle 109 and the electronic circuit provided at the vehicle body by swinging of the vehicle body. When the second harness 120b is disconnected by swinging of the vehicle body in this way, by detaching the connector 123b of the second harness 120b from the connector 123a of the first harness 120a to interchange, it is not necessary to interchange a total of a hub unit including the bearing apparatus, further, the regular and reverse rotation detecting sensor 115 can be utilized without being interchanged and maintenance can be carried out inexpensively and easily.

The regular and reverse rotation detecting sensor is 115 over to the harness 120 is molded by the resin-made external member 117 and connecting portions of the regular and reverse rotation detecting sensor 115 and the signal lines 118, 119 are reinforced and disconnection can be prevented.

Further, the magnetic sensor may not be limited to the regular and reverse rotation detecting sensor 115 but may detect only the rotational speed of the outer ring member 102.

Further, the harness 120 may not be divided but may connect the regular and reverse rotation detecting sensor 115 and the electronic circuit of the vehicle body.

According to the rolling bearing apparatus of the invention, there is achieved an effect of capable of detecting the rotational speed and the rotational direction of the axle, achieving compact formation of the rotation detector and excellent in the dust resistance performance.

According to the rolling bearing apparatus of the invention, there is achieved an effect of capable of inexpensively and easily carrying out maintenance when the harness is disconnected.

According to the rolling bearing apparatus of the invention, there is achieved in an effect of achieving a space saving formation of the rotation detector and capable of achieving compact formation of the bearing apparatus.

What is claimed is:

1. A rolling bearing apparatus comprising:
an inner ring member comprising a rotating ring having a raceway surface;
an outer ring member arranged concentric with the inner ring member, said outer ring member comprising a fixed ring having a raceway surface in correspondence with the inner ring member;
a rolling member interposed between the respective raceway surfaces of the inner ring member and the outer ring member;
a seal apparatus for sealing a clearance between the inner ring member and the outer ring member; and
a rotation detector for detecting a state of rotating the inner ring member,
wherein the seal apparatus includes an outer ring side seal ring fixed to the outer ring and an inner ring side seal ring fixed to the inner ring member, and
wherein the rotation detector includes a magnetic sensor molded by a resin-made external member to integrate therewith on an outer diameter side of a ring-like core metal of the outer ring side seal ring and a magnetic ring fixed to an inner face of a ring-like core metal of the inner ring side seal ring, said rotation detector detecting a rotational speed and a rotational direction of the inner ring member by the magnetic sensor detecting the magnetic ring.

2. The rolling bearing apparatus according to claim 1, wherein a harness of the magnetic sensor is divided into a first harness connected to the magnetic sensor and a second harness connected to an electric circuit of a vehicle body.

3. The rolling bearing apparatus according to claim 2, wherein the first harness and the second harness are connected to each other via a connector provided at a knuckle for fixing the outer ring member.

4. The rolling bearing apparatus according to claim 3, wherein the magnetic sensor includes a regular and reverse rotation detecting sensor.

5. The rolling bearing apparatus according to claim 4, wherein the magnetic ring includes a pulser ring.

6. The rolling bearing apparatus according to claim 5, wherein the rotational speed and the rotational direction of the inner ring member are detected by detecting a change in a magnetic field of the pulser ring by the regular and reverse rotation detecting sensor.

7. The rolling bearing apparatus according to claim 1, wherein the magnetic sensor includes a regular and reverse rotation detecting sensor.

8. The rolling bearing apparatus according to claim 7, wherein the magnetic ring includes a pulser ring.

9. The rolling bearing apparatus according to claim 8, wherein the rotational speed and the rotational direction of the inner ring member are detected by detecting a change in a magnetic field of the pulser ring by the regular and reverse rotation detecting sensor.

10. The rolling bearing apparatus according to claim 1, wherein the magnetic sensor comprises a Hall IC containing two Hall elements.

11. The rolling bearing apparatus according to claim 10, wherein the magnetic sensor is arranged with respect to a magnetizing pitch of the pulser ring so that output phases of the two Hall elements are shifted by 90 degrees.

12. A rolling bearing apparatus comprising:
an inner ring member comprising a fixed ring having a raceway surface;
an outer ring member arranged to the inner ring member concentric therewith, said outer ring member comprising a rotating ring having a raceway surface in correspondence with the inner ring member;
a rolling member interposed between the respective raceway surfaces of the inner ring member and the outer ring member;
a seal apparatus for sealing a clearance between the inner ring member and the outer ring member; and
a rotation detector for detecting a state of rotating the outer ring member,
wherein the seal apparatus includes an outer ring side seal ring fixed to the outer ring member and an inner ring side seal ring fixed to the inner ring member, and
wherein the rotation detector includes a magnetic sensor provided at an outer peripheral surface of a ring-like core metal of the inner ring side seal ring and a magnetic ring provided at a side face in an axial direction of a ring-like core metal of the outer ring side seal ring, said rotation detector detecting the state of rotating the outer ring member by the magnetic sensor detecting the magnetic ring.

13. The rolling bearing apparatus according to claim 12, wherein the magnetic sensor is integrated to the ring-like core metal of the inner ring side seal ring by being molded by a resin-made external member.

14. The rolling bearing apparatus according to claim 13, wherein a labyrinth is formed between the resin-made external member and the ring-like core metal of the outer ring side seal ring.

15. The rolling bearing apparatus according to claim 12, wherein a detecting face of the magnetic sensor and a detected face of the magnetic ring are arranged to be orthogonal to each other.

16. The rolling bearing apparatus according to claim 12, wherein a harness of the magnetic sensor is divided into a first harness connected to the magnetic sensor and a second harness connected to an electric circuit of a vehicle body.

17. The rolling bearing apparatus according to claim 16, wherein the first harness and the second harness are connected to each other via a connector provided at a knuckle for fixing the outer ring member.

18. A rolling bearing apparatus comprising:

an inner ring member comprising a rotating ring having a raceway surface;

an outer ring member arranged to the inner ring member concentric therewith, said outer ring member comprising a fixed ring having a raceway surface in correspondence with the inner ring member;

a rolling member interposed between the respective raceway surfaces of the inner ring member and the outer ring member; and a rotation detector for detecting a state of rotating the inner ring member, wherein the rotation detector includes a magnetic sensor provided on a side of the outer ring member and a magnetic ring provided on a side of the inner ring member, said rotation detector detecting a state of rotating the inner ring member by the magnetic sensor detecting the magnetic ring, wherein a harness of the magnetic sensor is divided into a first harness connected to the magnetic sensor and a second harness connected to an electronic circuit of a vehicle body, and wherein the first harness and the second harness are connected to each other via a connector provided at a knuckle for fixing the outer ring member.

19. The rolling bearing apparatus according to claim 18, wherein the magnetic sensor includes a regular and reverse rotation detecting sensor.

20. The rolling bearing apparatus according to claim 19, wherein the magnetic ring includes a pulser ring.

21. The rolling bearing apparatus according to claim 20, wherein a rotational speed and a rotational direction of the inner ring member are detected by detecting a change in a magnetic field of the pulser ring by the regular and reverse rotation detecting sensor.

22. The rolling bearing apparatus according to claim 18, wherein the magnetic sensor comprises a Hall IC containing two Hall elements.

23. The rolling bearing apparatus according to claim 22, wherein the magnetic sensor is arranged with respect to a magnetizing pitch of the pulser ring so that output phases of the two Hall elements are shifted by 90 degrees.

* * * * *